C. R. Tompkins's
Improved Cutter Head.

C. R. Tompkins, Inventor.
Rochester N.Y.

71341

PATENTED
NOV 26 1867

Witnesses
Geo. Frauenberger
Geo. Eichorn

United States Patent Office.

CHARLES R. TOMPKINS, OF ROCHESTER, NEW YORK.

*Letters Patent No. 71,341, dated November 26, 1867.*

IMPROVEMENT IN ADJUSTING CUTTER-HEADS TO PLANING-MACHINES.

*The Schedule referred to in these Letters Patent and making part of the same.*

TO ALL WHOM IT MAY CONCERN:

Be it known that I, CHARLES R. TOMPKINS, of the city of Rochester, county of Monroe, and State of New York, have invented a new and useful Improvement in the Manner of Adjusting Rotary-Cutter Heads to the work, and of securing the same to the revolving shaft; and I do hereby declare that the following is a full, clear, and exact description of the construction and operation of the same, reference being had to the annexed drawings, making a part of these specfications, in which—

Figure 1:
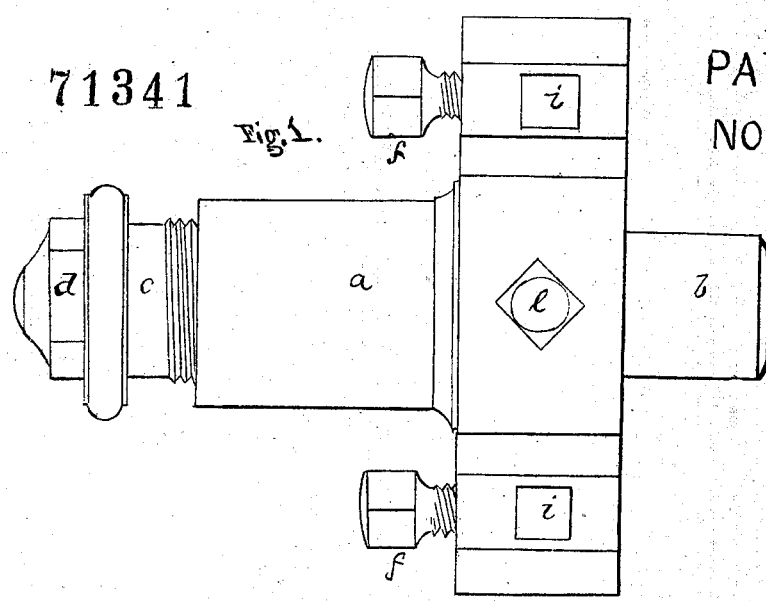
Figure 2:
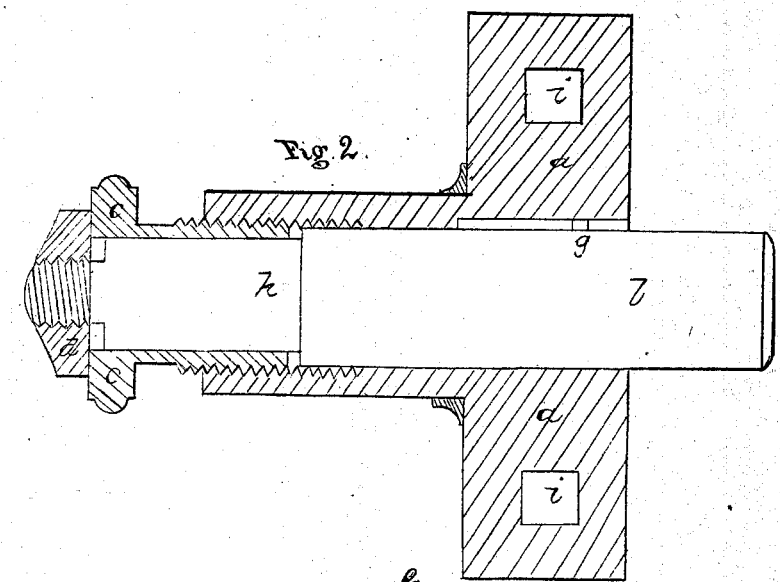
Figure 3:
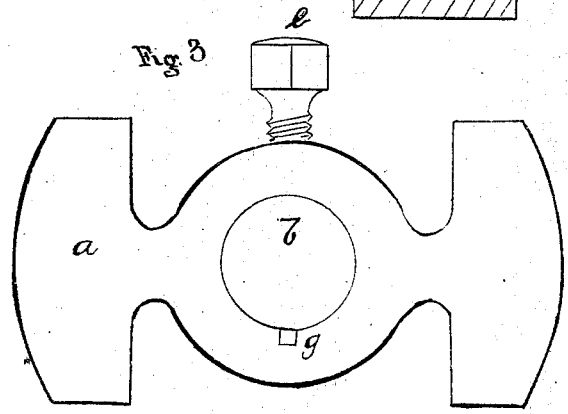

Figure 1 is an outside view,

Figure 2 an inside elevation,

Figure 3 a face view of the same.

Similar letters of reference indicate corresponding parts in the several figures.

The nature of my invention consists in constructing a rotary-cutter head, of any known form, with a hub or suitable projection, $a$, fig. 1, to receive the sleeve $c$. Into this hub I cut a screw as far as is necessary to give the requisite amount of lateral traverse to the head in adjusting the same. The sleeve $c$ has a corresponding screw cut upon the outside of it, and is closely fitted into hub $a$, fig. 2. This sleeve, $c$, may be fitted on the outside of hub $a$, and the screws reversed; in some instances it is more convenient to do so. The shaft $b$ is then fitted to the head as far as $h$, fig. 2, and has a pin or other suitable projection fitting into the slot $g$, for the purpose of driving the head when at work, and also to prevent it from turning on shaft $b$ while the sleeve $c$ is being turned for the purpose of adjusting the head sidewise to its proper position. The shaft $b$ is turned smaller at $h$, fig. 2, in order to receive the sleeve $c$, and allow it to revolve to the right or left, as may be required, the end of sleeve $c$ resting against the shoulder of shaft $b$ at $h$. Upon the end of shaft $b$ a nut, $d$, figs. 1 and 2, is fitted, so that when it is screwed down it brings the sleeve $c$ in contact with the shoulder of the shaft $b$ at $h$, and holds it firmly in position. Instead of the pin and slot $g$, figs. 2 and 3, a set-screw, $e$, may be inserted, to fit into a corresponding groove in the shaft. The openings $i\ i$ are to receive the cutters, and are fastened by means of set-screws $f\ f$.

To enable others to understand the use of my invention, I will briefly describe the manner of operating the same.

The operator places the head upon the shaft $b$, the nut $d$ and sleeve $c$ having been previously taken off. He then slides sleeve $c$ upon that part of the shaft that is turned down to receive it, until it comes in contact with the shoulder at $h$, fig. 2. The nut $d$ is then screwed on so as to press against sleeve $c$, but not so tight but that it may be readily turned to the right or left by the hand of the operator. The threads of the screw on sleeve $c$ are brought in contact with those in hub $a$; and, as the sleeve $c$ is turned backward or forward, the head is forced laterally on the shaft until the cutters are brought to their proper position, when the nut $d$ may be screwed down firmly, and the whole held in position until necessary to change it. Any number of heads may be fitted to the same sleeve, each having different-shaped cutters, for the purpose of doing a variety of work with the same machine.

What I claim as my invention, and desire to secure by Letters Patent, is—

The application to rotary-cutter heads, of the revolving sleeve $c$, with its screw, the shouldered shaft $h$, and the nut $d$, in connection with the pin and slot $g$, or set-screw $e$, for the purpose herein set forth, and substantially as described.

CHAS. R. TOMPKINS.

Witnesses:
GEO. FRAUENBERGER,
GEO. EICHORN.